(12) United States Patent
Wang et al.

(10) Patent No.: US 7,434,875 B2
(45) Date of Patent: Oct. 14, 2008

(54) AUTOMOBILE VENTILATION SEAT AND BACK CUSHION

(76) Inventors: Weili Wang, Dikang Avenue No. 3, High-Tech Development West Area, Chengdu, Sichuan Province (CN) 611731; Xiaoming Gong, Dikang Avenue No. 3, High-Tech Development West Area, Chengdu, Sichuan Province (CN) 611731

( * ) Notice: Subject to any disclaimer, the term of this patent is extended or adjusted under 35 U.S.C. 154(b) by 0 days.

(21) Appl. No.: 11/514,834

(22) Filed: Sep. 5, 2006

(65) Prior Publication Data
US 2007/0063552 A1    Mar. 22, 2007

(30) Foreign Application Priority Data
Sep. 6, 2005    (CN)  .................... 2005 1 0021619

(51) Int. Cl.
*A47C 7/42*    (2006.01)

(52) U.S. Cl. .............................. 297/180.14; 297/452.47

(58) Field of Classification Search ............ 297/180.11, 297/180.14, 452.46, 452.47, 217.3
See application file for complete search history.

(56) References Cited

U.S. PATENT DOCUMENTS

| | | | | |
|---|---|---|---|---|
| 4,413,857 A | * | 11/1983 | Hayashi ............... | 297/180.11 X |
| 5,372,402 A | * | 12/1994 | Kuo ....................... | 297/180.11 |
| 5,382,075 A | * | 1/1995 | Shih ....................... | 297/180.14 |
| 5,613,730 A | * | 3/1997 | Buie et al. ........... | 297/180.11 X |
| 6,869,140 B2 | * | 3/2005 | White et al. ........... | 297/180.14 |

FOREIGN PATENT DOCUMENTS

DE    3903303 A1 *    8/1990

* cited by examiner

*Primary Examiner*—Anthony D Barfield
(74) *Attorney, Agent, or Firm*—Perkins Coie LLP; Manni Li

(57) ABSTRACT

A ventilation seat and back cushion for an automobile seat, comprising an integrated seat and back cushion, a main air conduit, an axial flow fan at one end of the main air conduit, and multiple branch air conduits inside the seat cushion and back cushion, all being connected to the main air conduit.

10 Claims, 2 Drawing Sheets

AUTOMOBILE VENTILATION SEAT AND BACK CUSHION

CROSS-REFERENCE TO RELATED APPLICATION

This application claims the priority of Chinese Patent Application No. 200510021619.1, filed on Sep. 6, 2005, the subject matter and contents of which is incorporated herein by reference.

TECHNICAL FIELD OF THE INVENTON

The present invention relates to seating articles of a car, namely, a ventilation seat and back cushion for an automobile seat.

BACKGROUND OF THE INVENTION

Basically, the motor vehicles are equipped with air conditioning equipment. The environmental temperature inside the vehicle is generally comfortable, but the heat of buttocks and back can not disperse after seating for a long time, especially the lumbar muscle is easy to be tired, which makes the driver feel uncomfortable. The ventilation seat cushion or back cushion has been developed for heat dispersion. However, the existing ventilation seat cushion or back cushion disperse heat through the air outlet of vehicle air conditioning or fan with complicated structure generally and comparatively bad effect in dispersing heat and dispelling tiredness.

Some seat cushion and back cushion in the market also sets a ventilation cushion with air conduit, whose overall structure adopts air supply from the base and can conduct ventilation and heat dispersion to some extent, but its ventilation effect is not very good as the body weight may result in pipeline blocking and loss of wind speed at the cornering area. U.S. Patent Application Publication US2004/0160092A1 which was published on Aug. 19, 2004, with Title: "A Ventilated Seating System" also discloses a ventilated seating system with back cushion and seat cushion (both connected to a roll bearing), and the roll bearing can roll along the axes line with air hole, whose operational principle is that the air outlet of vehicle air conditioning supplies air and disperses heat through rolling of the roll bearing. This structure makes some advancement against similar products, but it is still complicated, especially the connection to the roll bearing, resulting in difficulty in production, inconvenience of installation, and increase of vehicle energy consumption.

SUMMARY OF THE INVENTION

The present invention provides a general car seat and back cushion, which can avoid the above-mentioned shortcomings, is comfortable and cool to seat with smooth heat dispersion, skillful structure, attractive appearance, very easy installation, and adjustable air quantity, can conduct lumbar massage to relieve tiredness as well as plays an active role in energy conservation, health care, and safety pilot.

The technical issue brought forward by the present invention is solved by constructing an automobile ventilation seat and back cushion comprised of a seat cushion and a back cushion connected to each other and provides a main air conduit and an axial flow fan installed at the port of the main air conduit, which is set at the joint of the seat cushion and back cushion; and several branch air conduits, which are set inside the seat and back cushion and are all connected to the main air conduit.

The automobile ventilation seat and back cushion of the present invention provides an adjusting knob set at or a control panel connected to the main plug of the axial flow fan, which has two or more control outputs.

The automobile ventilation seat and back cushion of the present invention provides an air pump installed at the port of the other end of the main air conduit, which is set inside the back cushion and connected to the massage air bag and can be adjusted through the regulating valve of the main plug or the control panel connected to the main plug. The adjusting knob or control panel has two or more control outputs: one controls the wind speed of the axial flow fan and the other controls the air supply frequency of the air pump.

The automobile ventilation seat and back cushion of the present invention provides an electric massager available to be installed inside the back cushion, which can be adjusted through the regulating valve of the main plug or the control panel connected to the main plug. The adjusting knob or control panel has two or more control outputs: one controls the wind speed of the axial flow fan and the other controls the vibration frequency of the electric massager.

The automobile ventilation seat and back cushion of the present invention provides a flexible bolster available to be installed inside the back cushion or seat cushion.

The automobile ventilation seat and back cushion of the present invention provides several air outlets set at the surface of the seat cushion and back cushion, which are connected to corresponding branch air conduits.

The automobile ventilation seat and back cushion of the present invention provides that the axial flow fan and the air pump can be set inside the back cushion.

The automobile ventilation seat and back cushion of the present invention provides that the main air conduit is connected with the branch main air conduit by the pipelines.

The automobile ventilation seat and back cushion of the present invention provides a rapid locking component set at the underside of the said main air conduit, which can be locked in the gap at the end lap of the back rest of the vehicle seat.

The automobile ventilation seat and back cushion of the present invention provides that the overall structure with the seat cushion and back cushion connected as a whole takes the shape of an arc when not used and will cling to the seat due to the elastic deformation of seat and back cushion through the tension of the locking component when used and without cross displacement.

The automobile ventilation seat and back cushion of the present invention provides that the power supply from the car is used for ventilation, heat dispersion, and massage.

The automobile ventilation seat and back cushion of the present invention provides good performance in ventilation, heat dispersion, and massage with reasonable structure and can be fixed rapidly, solving such problems as the discomfort of the human body, impact on the normal use of vehicle air conditioning, and bad effect of ventilation and heat dispersion, etc.

DETAILED DESCRIPTION OF THE INVENTION

Figure 1:
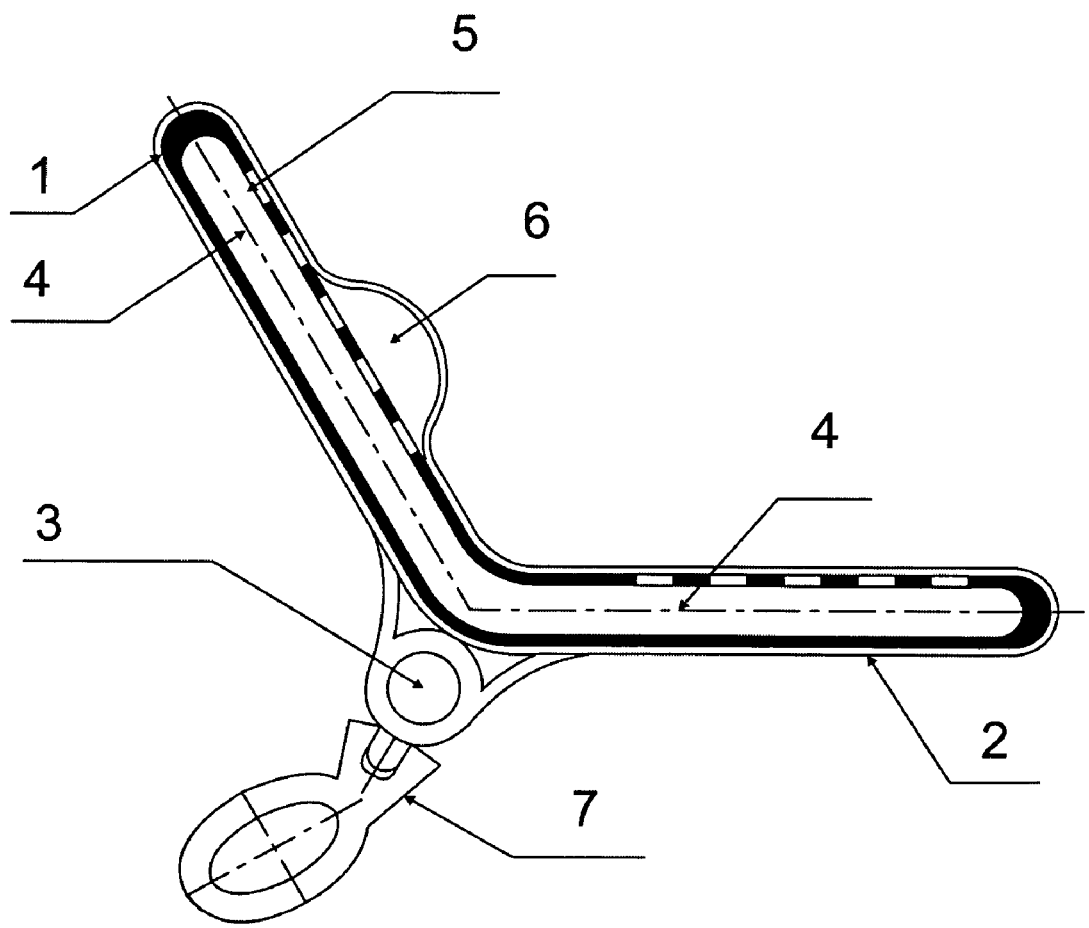
FIG. 1 illustrates the profile section view of the automobile ventilation seat and back cushion provided by the present invention.
Figure 2:
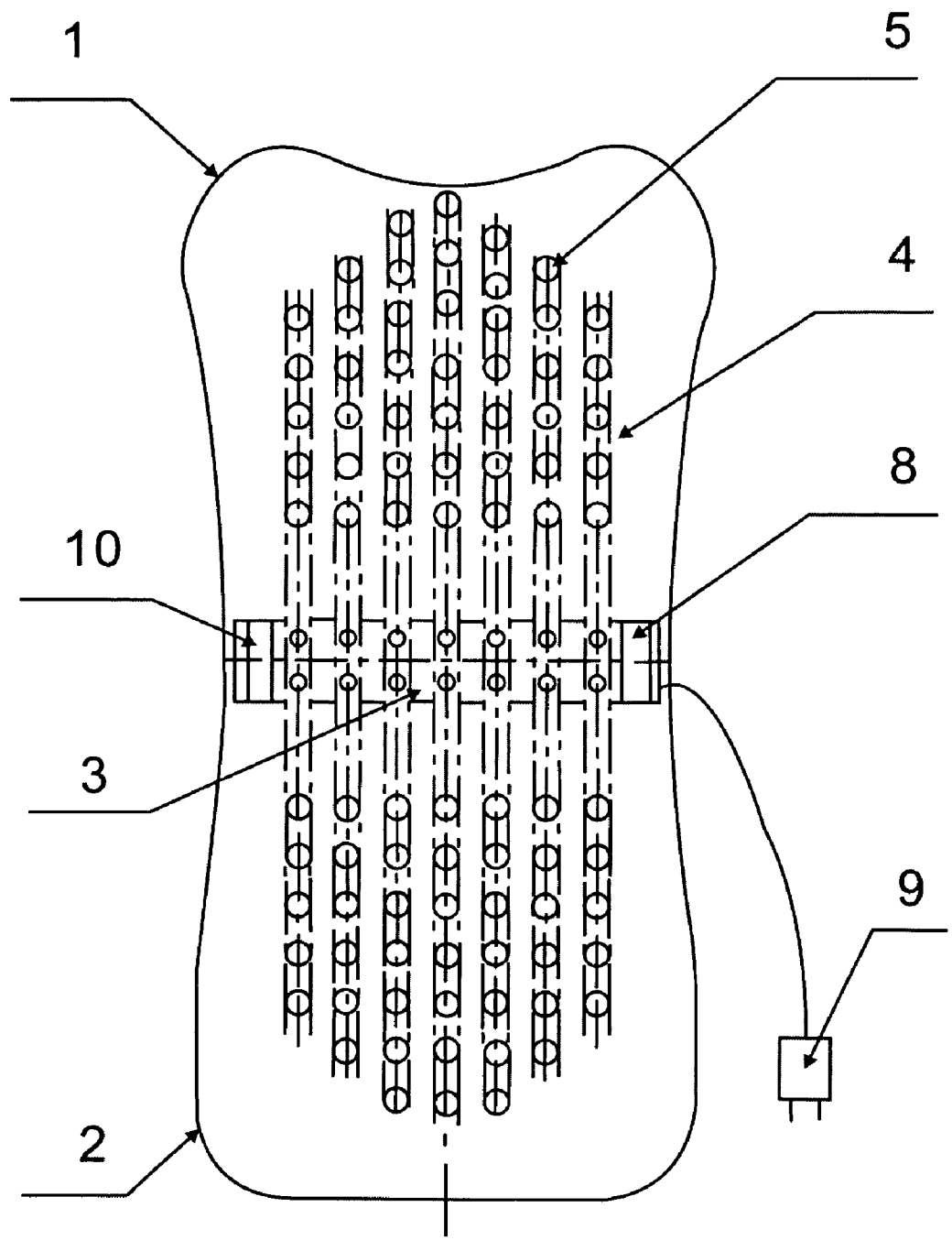
FIG. 2 illustrates the developing drawing of the automobile ventilation seat and back cushion provided by the present invention.

In FIGS. 1 and 2, number 1 represents back cushion, 2 seat cushion, 3 main air conduit, 4 branch air conduit, 5 air outlet, 6 electric massager (or air bag, bolster), 7 rapid locking component, 8 axial flow fan, 9 main plug, and 10 air pump. As for the automobile ventilation seat and back cushion provided by this invention, the seat cushion 2 and the back cushion 1 are connected as a whole with adjustable size, shape and thickness for different requirements and the main air conduit 3 is set at the outside of the joint of the seat cushion 2 and the back cushion 1. During usage, the main air conduit 3 can also be set at the slot gap of the seat back rest and the base, which utilizes the structure feature of car seats with reasonable setting, space saving, and smooth ventilation. Several branch air conduits 4 are set inside the seat cushion 2 and the back cushion 1; the branch air conduits 4 are connected with the main air conduit 3 through pipelines; several air outlets 5 are set at the surface of the seat and back cushion; and the air outlets 5 are connected with the branch air conduits 4, which shall not affect the wind speed. The axial flow fan 8 is set at the port of the main air conduit 3 and the wind speed of the axial flow fan 8 can be adjusted through the regulating valve of the main plug 9 or the control panel connected to the main plug 9, having two or more control outputs. The power supply from the car is used for ventilation, heat dispersion, and massage of the seat and back cushion. The operational principle of the automobile ventilation seat and back cushion provided by this invention is to use the driving exhaustion capacity of the high quality axial flow fan 8 to exhaust the air in the car successively through the main air conduit 3 and each branch air conduit 4, and ultimately through the air outlets 5.

The automobile ventilation seat and back cushion of the present invention provides three modes of massage and health care, including 1. Set an electric massager inside the seat and back cushion, which is controlled through the regulating valve of the main plug 9 or the control panel connected to the main plug 9, thus forming the massage effect;

2. Set an air bag inside the seat and back cushion connected to the air pump at the other end of the main air conduit, which is also controlled through the regulating valve of the main plug 9 or the control panel connected to the main plug 9, thus forming the massage effect;

3. Set directly a bolster inside the seat and back cushion.

The automobile ventilation seat and back cushion of the present invention also sets the rapid locking component 7 which is connected with the bottom of the main air conduit 3 and can rapidly and effectively fix the automobile ventilation seat and back cushion onto the seat. In addition, the overall structure with the seat cushion and back cushion connected as a whole takes the shape of an arc when not used and will cling to the seat due to the elastic deformation of the seat and back cushion through the tension of the locking component in use and without cross displacement. This invention can set a cushion cover as well, which is made of different ventilation plus materials with elastic belt and can be fixed onto the seat together with the seat cushion 2 and the back cushion 1.

In brief, the automobile ventilation seat and back cushion of the present invention is comfortable and cool to seat with smooth heat dispersion, reasonable structure, attractive appearance, very easy installation, adjustable air quantity, and massage level: it can relieve lumbar tiredness as well as play an active role in energy conservation, health care, and safety pilot. Furthermore, the automobile ventilation seat and back cushion provided by this invention can be not only used in automotives and but also in aviation, school, Internet bar, navigation, and family, etc.

We claim:

1. A ventilation seat and back cushion for an automobile seat comprising
   an integrated seat cushion and back cushion,
   a main air conduit installed horizontally along substantially entire border where the seat and back cushion are connected,
   an axial flow fan laterally disposed at a port of the main air conduit,
   multiple branch air conduits inside the seat cushion and back cushion, all being connected to the main air conduit, and
   multiple air outlets extending through a surface of the seat cushion and back cushion, each air outlet corresponding to and being connected to the branch air conduit.

2. A ventilation seat and back cushion for automobile seat comprising
   an integrated seat cushion and back cushion,
   a main air conduit installed horizontally along substantially entire border where the seat and back cushion are connected,
   an axial flow fan laterally disposed at a port of the main air conduit,
   multiple branch air conduits inside the seat cushion and back cushion, all being connected to the main air conduit,
   a massage air bag inside the back cushion, and
   an air pump at another end of the main air conduit, wherein the air pump is connected to the massage air bag.

3. The ventilation seat and back cushion as described in claim 2, wherein the axial flow fan and the air pump are inside the back cushion.

4. The ventilation seat and back cushion as described in claim 1, further comprising
   an electric massager inside the back cushion.

5. The ventilation seat and back cushion as described in claim 1, further comprising
   an adjusting knob or a control panel connected to an electric plug of the axial flow fan, wherein the adjusting knob or the control panel provides two or more control outputs of the axial flow fan.

6. The ventilation seat and back cushion as described in claim 1, wherein the main air conduit is connected to the multiple branch air conduits via pipelines.

7. A ventilation seat and back cushion for automobile seat comprising
   an integrated seat cushion and back cushion,
   a main air conduit installed horizontally along substantially entire border where the seat and back cushion are connected,
   an axial flow fan laterally disposed at a port of the main air conduit,
   multiple branch air conduits inside the seat cushion and back cushion, all being connected to the main air conduit, and
   a rapid locking component which connects to a bottom of the main air conduit.

8. The ventilation seat and back cushion as described in claim 7, wherein the integrated seat cushion and back cushion is arc-shaped when unoccupied, and when occupied, through tension of the rapid locking component, clings to the automobile seat due to elastic deformation without displacement.

9. The ventilation seat and back cushion as described in claim 4, further comprising
a flexible bolster inside the back cushion.

10. The ventilation seat and back cushion as described in claim 7, wherein the rapid locking component is placed at a gap formed at an end lap of a back rest of the automobile seat.

* * * * *